July 20, 1937.  R. NAUJOKS  2,087,385
FILTER
Filed Sept. 10, 1935
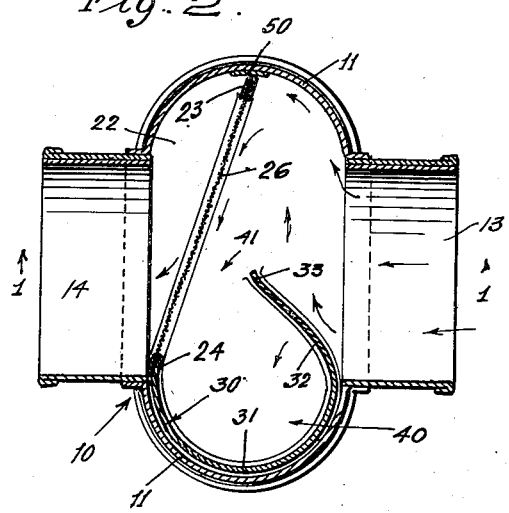
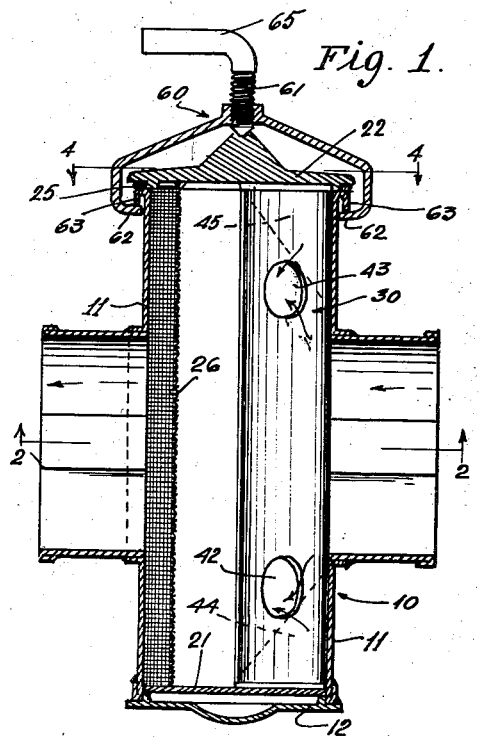
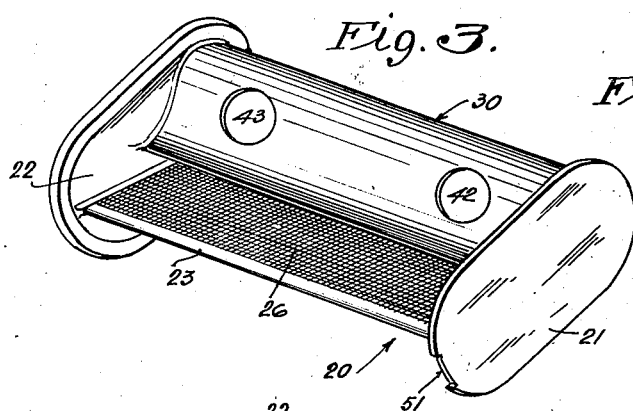
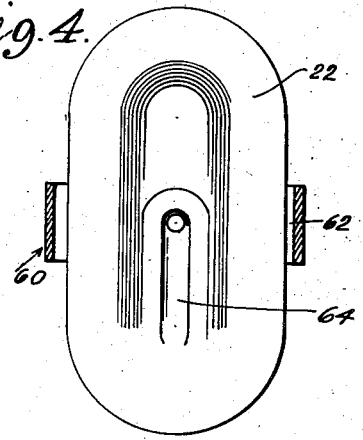
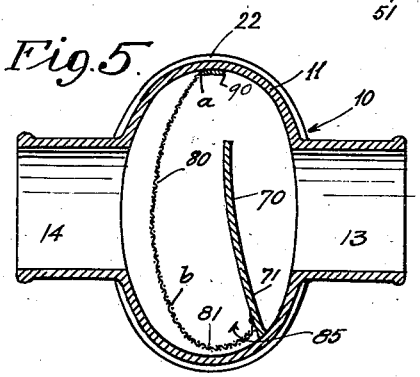
Inventor.
Rudolph Naujoks.
Attorney.

Patented July 20, 1937

2,087,385

UNITED STATES PATENT OFFICE 2,087,385

FILTER

Rudolph Naujoks, Los Angeles, Calif.

Application September 10, 1935, Serial No. 39,907

5 Claims. (Cl. 210—165)

My invention has to do with filters and, in its more particular aspects, relates to filters adapted to screen out and collect solids from the cooling system of an automobile motor for instance. In such systems the cooling water becomes loaded with particles of rust, dirt and the like which deposit in some relatively quiet zone—usually the radiator—clogging up or materially reducing the operating efficiency.

While filters having sediment traps are not new, the known devices of this character have shortcomings which render them either inefficient or unsuitable for uses in such installations requiring frequent cleaning and removal of collected solids. Among these shortcomings are: the positioning and construction of the screen and baffle elements which permit the solid particles to lodge in the screen mesh; the collection of solids in a zone which interferes with the efficiency of the screen element; the occurrence of relatively quiet zones or pockets within the device, apart from the intended point of collection of sediment, wherein solid particles collect and diminish the efficiency of operation; and, very important, the complicated nature of their design and construction which renders such devices expensive to manufacture and difficult to disassemble and reassemble for the purpose of the thorough cleaning which is so frequently required for efficient operation.

Thus it is among the principal objects of my invention to provide a filter in which these shortcomings are overcome. Generally stated, I attain these objects and others which will appear obvious from the following detailed description of a preferred embodiment, by employing a tubular casing with inlet and outlet openings on its opposite sides, and by providing a removable core unit mounted longitudinally in the casing, across the axis of the inlet and outlet. This core assembly carries the screen, the baffle, the sediment trap and a scraper to clean the casing interior as the core is withdrawn—all formed as a unit which may be withdrawn from the casing with minimum of effort to enable thorough cleaning and easy reassembly.

This application is a continuation in part of my previously filed application Serial Number 612,749 filed May 21, 1932.

To better explain my invention, I now refer to the accompanying drawing, which is illustrative of one particular adaptation, and in which:

Fig. 1 is a longitudinal medial section through the device on line 1—1 of Fig. 2;

Fig. 2 is a vertical section on line 2—2 of Fig. 1;

Fig. 3 is a perspective of the removable core assembly;

Fig. 4 is a plan view of the end cover plate carried by the removable core; and

Fig. 5 is a vertical section of a modified construction.

In the drawing, the numeral 10 designates the casing, which may be of tin or other suitable material, having a tubular body 11, here instanced as being substantially ovate and uniform in cross-section throughout its length. One end of the casing is closed by integral wall 12, the opposite end being closed by an end plate carried by the frame or core assembly to be hereinafter described. An inlet 13 and an outlet 14 are provided on opposite sides of body 11 substantially midway between its ends.

Removably and longitudinally mounted in body 11 is a frame or core assembly 20 extending from end to end of the body and comprised of an inner end plate 21 and an outer closure plate 22 connected together by longitudinal frame bar 23, and the baffle and screen members to be later described. Inner end plate 21 is preferably of the size and shape of the body interior so as to prevent liquid from passing therearound and so as to serve as a scraper to clean the body interior when the core assembly is withdrawn. Outer end plate 22 is shaped like but is larger than the body cross-section so as to provide a closure for the otherwise open end of the body when clamped thereon as will be later described, a rubber gasket 25 being provided between plate 22 and the open end of the body to make a fluid tight seal.

Extending parallel to the body axis and across the inlet axis, is a rectangular screen element, here instanced as being of metal wire although obviously it may be composed of other suitable materials. This screen extends from end to end of the core unit and is preferably soldered at its ends to end plates 21, 22. As best shown in Fig. 2, it is affixed at its top side to longitudinal bar 23 and extends diagonally downwardly and outwardly to a point adjacent the bottom of outlet 14 where, at 24, it is affixed to the integrally formed baffle and sediment trap plate 30 to be now described.

This plate 30 is preferably made of some non-corrosive metal. As just described, it is connected to the lower side of the screen at 24 from where it curves at 31 to conform to the size and shape of the body interior from outlet 14 to inlet 13 to form a sediment trough or trap 40, whence it curves inwardly and upwardly in front of the inlet, as shown at 32, and then upwardly and outwardly at and adjacent its side 33, thus presenting a baffle spaced inwardly in front of inlet 13 to divert the incoming liquid upwardly from whence the stream then flows downwardly and somewhat parallel to and through the diagonally disposed screen 26. The baffle extends from end to end of the core unit 20 parallelling the screen and across the inlet axis, preferably being soldered to end plates 21, 22 at its ends.

The sediment collecting trap or trough 40 is formed by the curved plate 30 and is closed at its ends by core end-plates 21, 22. Any solid particles which might enter the device in the stream strike the diagonally disposed screen in the current which is then flowing downwardly and substantially parallel to the screen, and are deflected into chamber 40, through the space 41 between the baffle and screen, where they remain out of interference with the screen. The baffle deflects the fluid upwardly away from chamber 40 and thus a relatively quiet zone is maintained in the chamber.

The corner spaces 44 and 45 between the baffle and body interior (as defined by the dotted lines in Fig. 1) are somewhat offset from the main direction of flow and thus present relatively quiet zones or pockets in which solids have a tendency to collect. To prevent this, holes 42 and 43, one through the baffle adjacent each of its ends, are provided so that a relatively small part of the incoming fluid flows through those holes and draws into chamber 40 any solids that might otherwise collect in pockets 44, 45. While I have found two such holes preferable, one adjacent each end of the baffle, I wish it understood that this number may be varied in accordance with the length of the body interior on each side of the inlet or, in other words, in accordance with the area of the pocket or quiet zone, and in accordance with the pressure and volume of liquid being filtered.

To facilitate assembly and disassembly of the device, body 11 is provided with a longitudinal rib 50 at its top interior, and end plate 21 is notched at 51, which notch cooperates with the rib to form a track or guideway for inserting and removing frame 20 into and out of body 11.

To hold end plate 22 and gasket 25 against the open end of body 11, I provide a clamp 60 having a member 61 screw-threaded through its top central portion, and fingers 62 which enter and rest under peripheral flange 63 on body 11. End plate 22 has a groove 64 which extends and tapers upwardly from one of its ends to the top center of the plate (Fig. 4). Thus in assembling the device, the clamp is placed over the plate 22 with fingers 62 under flange 63, the inwardly projecting end of screw member 61 fitting into groove 64, and as the clamp is moved along the tapered groove towards the center of the plate, the plate is pressed downwardly against the body end. When the clamp reaches the center of the plate (at the end of groove 64), member 61 is screwed inwardly and further presses and holds plate 22 and gasket 25 against the body end to form a liquid tight seal. A handle 65 is provided on screw 61 to facilitate its operation. Conversely, to disassemble and clean the device, member 61 is unscrewed and the clamp moved off the end plate along the groove, permitting the frame or core with its carried elements to be removed from the body for cleaning.

From the foregoing description, it will be seen that all fluid entering inlet 13 must pass through the screen before emerging from the outlet, the solid particles entering with the stream meanwhile separated and collected in one trap 40, where they are held, out of interference with the screen, until the core or frame 20, with its carried elements, is removed for cleaning. During this removal, inner end plate 21 of the core assembly scrapes the body interior and removes any deposit that has formed thereon. The top side of screen 26, where it is affixed over bar 23, contacts the longitudinal body rib 50 sufficiently close to prevent fluid and solids from passing around the screen. The interior body area is greater than the area of the restricted inlet, which accordingly diminishes the current velocity as it reaches and passes through the screen and tends to prevent the solid particles from being forced into the screen mesh where they might become lodged. The diagonal mounting of the screen and the direction of the liquid stream parallel to the screen also tend to prevent these solid particles from lodging in the screen and direct them into receptacle 40 wherein a relatively quiet zone is maintained by the baffle.

A variational form of filter and baffle element are illustrated in Fig. 5. Here the casing 10 is of the same type heretofore described, having inlet 13 and outlet 14 on opposite sides of the body 11; the body 11 is closed at one end by an integral wall 12 (not shown) and is open at its other end, as before described. Baffle 70 extends longitudinally of the casing across the axis of the inlet and is affixed at its respective ends to core end plates 21 (not shown) and 22. Screen 80 is affixed at its ends to plates 21 (not shown) and 22, at its bottom side to the lower end of baffle 70 and at its top side to longitudinal frame bar 90. The screen likewise extends longitudinally of the casing across the inlet axis. Here the screen curves at its bottom 81 to form one side and the bottom of sediment collecting trough 85, the other side of the trough being formed by the lower end 71 of baffle 70. The baffle diverts the incoming stream (as shown by dotted lines) so as to maintain a relatively quiet zone in trough 85. While in this form the screen forms the greater part of the sediment chamber, the effective screening area of the screen is between points $a$ and $b$ in Fig. 5 so that the sediment chamber is out of interference with the effective screen area. In this form of device the screen, baffle, sediment chamber and end plates 21, 22 are all components of the removable core unit as before described and may be withdrawn as a unit in the same manner, and the cover plate 22 is clamped onto the body by the clamp in the manner shown in Fig. 1.

While the preferable position of the devices in use is the horizontal position illustrated in Figs. 2 and 5, the device is designed so that it may be tilted in either direction without destroying its efficiency.

While I have resorted to various details of structure and arrangement in describing a preferred embodiment of my invention, it is to be understood that the foregoing description and drawing are to be considered as illustrative rather than restrictive since various changes in structure and arrangement may be made without departing from the scope of my invention as defined by the appended claims.

I claim:

1. In a liquid filter having a tubular body closed at one end and an inlet and an outlet opening on its opposite sides, a core assembly, mounted longitudinally in the body and being removable therefrom as a unit, including: an inner end plate, an outer end plate forming a closure for the open end of the body, a screen and a baffle extending substantially parallel to each other from the inner end plate to the outer end plate across the inlet axis, said screen and baffle being connected together at their bottom sides to form a sediment collecting trough below the plane of the top of the baffle.

2. In a liquid filter having a tubular body closed at one end and an inlet and an outlet opening on its opposite sides, a core assembly, mounted longitudinally in the body, including: an inner end plate conforming to the size and shape of the body interior, an outer end plate forming a closure for the open end of the body, a screen and a baffle extending from one of the end plates to the other across the inlet axis, said screen and baffle being connected together at their bottom sides to form a sediment collecting trough below the plane of the top of the baffle, said screen and baffle being secured at their ends to the respective end plates so that the entire core assembly is removable from the body as a unit.

3. In a liquid filter having a tubular body with end closures and an inlet and outlet opening on its opposite sides, a core assembly, mounted longitudinally in the body and being removable therefrom as a unit, including: a screen separating the body interior between the inlet and outlet and a baffle plate between the screen and inlet, the screen and baffle extending from end to end of the body in a plane parallel to the longitudinal body axis and a curved plate formed integrally with and as a continuation of the baffle member, the curved plate forming a sediment receptacle between the baffle and screen.

4. In a liquid filter having a tubular body closed at one end and an inlet and an outlet opening on its opposite sides, a core assembly, mounted longitudinally in the body and being removable therefrom as a unit, including: an inner end plate, an outer end plate forming a closure for the open end of the body, a screen and a baffle extending substantially parallel to each other from the inner end plate to the outer end plate across the inlet axis, said screen and baffle being connected together at their bottom sides to form a sediment collecting trough below the plane of the top of the baffle, and a guideway for longitudinal movement of the core assembly into and out of the body, comprising a longitudinal rib affixed to the body interior and a cooperating slot formed in the inner end plate of the core.

5. In a liquid filter, a tubular body of uniform cross-section throughout its length and open at one end, an inlet and an outlet opening on opposite sides of the body, and a core assembly, mounted longitudinally in the body and being removable therefrom as a unit, including: an inner end plate conforming to the size and shape of the body interior, an outer end plate forming a closure for the open end of the body, a screen affixed at its ends to the end plates and extending diagonally downwardly and outwardly from the medial top portion of the body interior to a point adjacent the body outlet, a baffle plate mounted parallel to the screen between the screen and inlet opening and a sediment trough comprised of a curved plate formed integrally with and as a continuation of the baffle member, said curved plate being connected at one of its sides to the screen adjacent the outlet opening; and means for holding the end closure plate against the open casing end, comprising a screw-tensioned clamp which engages a peripheral flange on the body.

RUDOLPH NAUJOKS.